United States Patent [19]

Smith et al.

[11] 3,953,617

[45] Apr. 27, 1976

[54] METHOD OF PRODUCING ENCAPSULATED THERMONUCLEAR FUEL PARTICLES

[75] Inventors: Warren H. Smith, Dayton; William L. Taylor, Cincinnati; Harold L. Turner, Dayton, all of Ohio

[73] Assignee: The United States of America as represented by the United States Energy Research & Development Administration, Washington, D.C.

[22] Filed: Jan. 28, 1974

[21] Appl. No.: 438,499

[52] U.S. Cl. .............................. 427/6; 176/91 SP; 252/301.1 R; 427/215; 427/237; 427/398
[51] Int. Cl.² .......................................... G21C 3/06
[58] Field of Search .............. 427/6, 215, 237, 255, 427/398; 252/301.1 R; 176/91 SP

[56] References Cited
UNITED STATES PATENTS

| | | | |
|---|---|---|---|
| 1,505,209 | 8/1924 | Leach et al. | 252/301.1 R |
| 3,270,098 | 8/1966 | Barr et al. | 252/301.1 R |

FOREIGN PATENTS OR APPLICATIONS

| | | | |
|---|---|---|---|
| 843,838 | 8/1960 | United Kingdom | 252/301.1 R |

*Primary Examiner*—Harry J. Gwinnell
*Assistant Examiner*—Dennis C. Konopacki
*Attorney, Agent, or Firm*—John A. Horan; Dudley W. King; Richard E. Constant

[57] ABSTRACT

A method of producing a fuel particle is disclosed, which comprises forming hollow spheroids which have a mass number greater than 50, immersing said spheroids while under the presence of pressure and heat in a gaseous atmosphere containing an isotope, such as deuterium and tritium, so as to diffuse the gas into the spheroid and thereafter cooling said spheroids up to about 77° Kelvin to about 4° Kelvin.

4 Claims, 3 Drawing Figures

U.S. Patent   April 27, 1976   3,953,617
FIG. 1
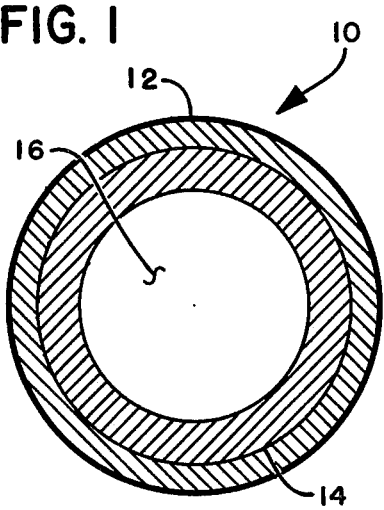
FIG. 2
FIG. 3
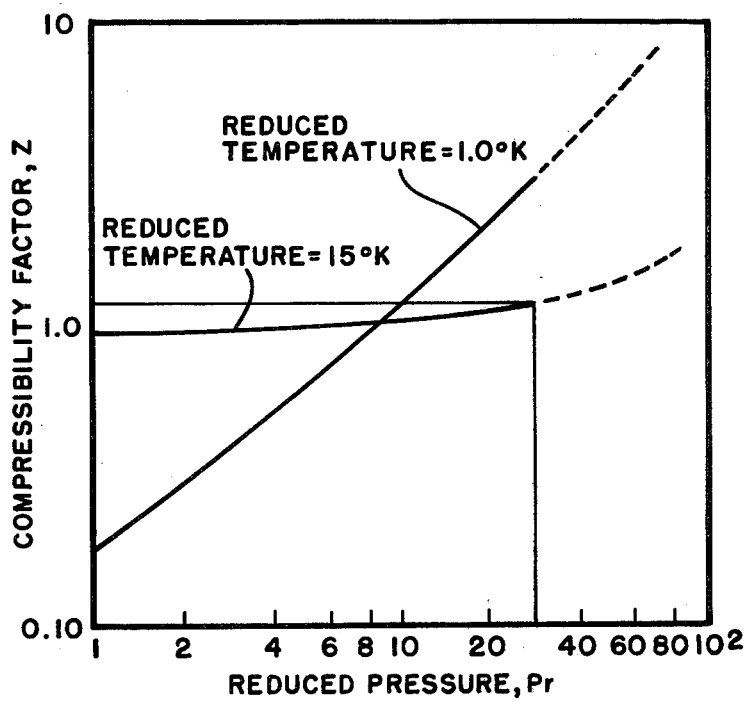
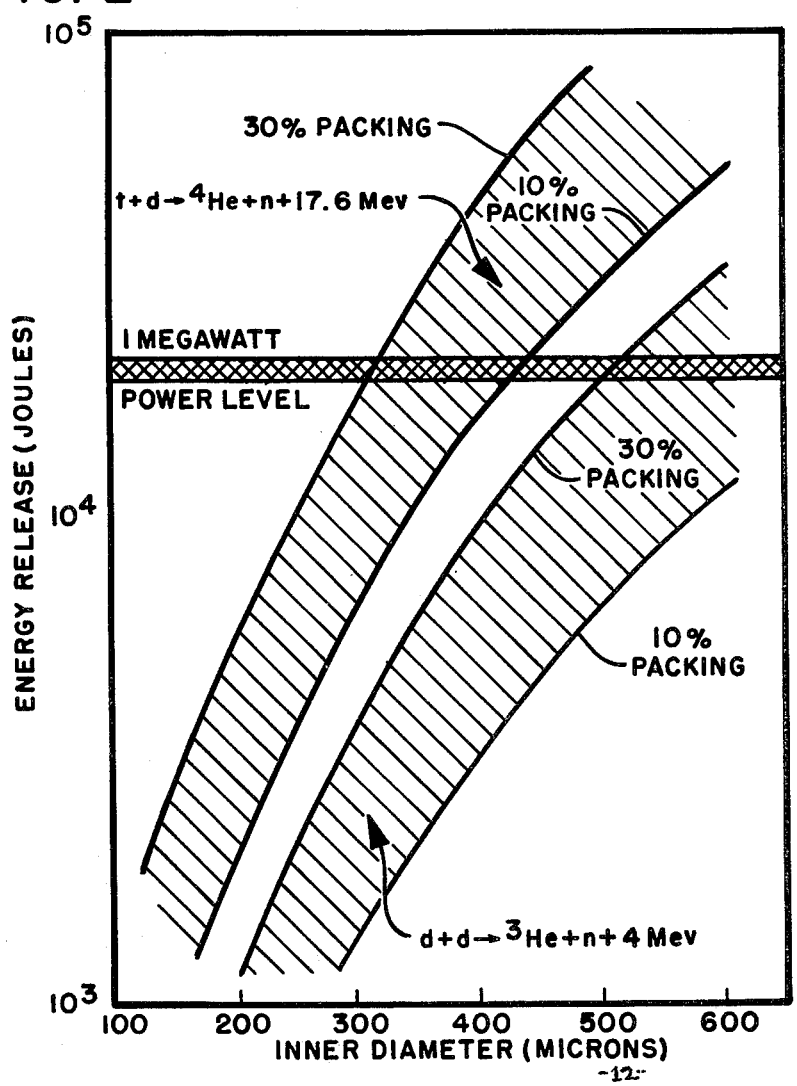

METHOD OF PRODUCING ENCAPSULATED THERMONUCLEAR FUEL PARTICLES

BACKGROUND OF INVENTION

This invention relates to fuel particles of particular configuration. Work in connection with energy studies and development has indicated the desirability of an improved fuel particle embodying deuterium or tritium, or combinations thereof, which would afford the opportunity of custom-loading same. Such would provide for quantized "mini-explosions". One area in which such is desired is that wherein the particle is subjected to laser beams. Particulate fuel material for the above would provide a fuel for use in fusion reactor development, and additionally for plasma, material and gas studies.

It has been suggested that fuel forms might be a drop of hydrogen isotope dropped into the path of a laser. A disadvantage of this is that there is no protective or other coating or ablative material, and much of the fuel is quickly ablated away or disappears. Other disadvantages include an inability to accurately load (i.e., custom load) a device for specific power or energy, storage of measured fuel forms, etc. As such, present fuel forms do not provide for custom-loaded particulate fuel.

SUMMARY OF INVENTION

In view of the above referred-to desires and limitations to present processes and fuel forms, it is an object of this invention to provide an improved fuel particle, or what might be termed a thermonuclear fuel form.

It is a further object of this invention to provide a fuel form in which a protective coating is provided such that the outer fuel surface is not quickly ablated away and that provides a degree of inertial confinement for the resulting plasma thereby increasing the density and confinement time of the plasma at the center of the sphere resulting in a higher probability of nuclear (fusion) reaction.

It is a further object of this invention to provide a particulate fuel form that may contain a desired amount of material and hence potential nuclear (fusion) energy.

It is a further object of this invention to provide a particulate fuel form that may be used for subjection to high powered laser beams.

It is a further object of this invention to provide a simpler method for making the improved fuel particle.

Various other objects and advantages will become apparent from the following description of this invention and the most novel features will be pointed out with particularity hereinafter in connection with the appended claims. It is understood that various changes in the details, materials and process steps which are herein described and illustrated to better explain the nature of the invention, may be made by those skilled in the art without departing from the scope of the invention.

The invention comprises, in brief, the method for making an encapsulated fuel, and the product formed thereby having an exterior shell of a relatively high atomic number material (relative to the fuel atomic mass), an inner concentric shell of fuel at the inside surface of the high atomic number shell, and the interior volume being at least partially evacuated.

DESCRIPTION OF DRAWING

FIG. 1 is an enlarged cross section illustration of a fuel particle of this invention.

FIG. 2 graphically illustrates energy releases or outputs for microsphere fuel particles.

FIG. 3 is a graph illustrating generalized compressibility factor.

DETAILED DESCRIPTION

FIG. 1 illustrates an enlarged view of a loaded microsphere 10 or otherwise generally spheroidal fuel particle or form which, together with the method of making same, is the subject of this invention. The fuel microsphere includes an exterior shell 12 of a suitable high atomic number material or metal. Those materials or metals which may be used may be such as nickel, gold, uranium, etc., and may have an atomic number above mass 50. Preferred materials have the higher atomic numbers. The thickness of the shell 12 wall of the metal microsphere may range from about 1 to about 30 microns. The diameter of the microsphere in the finished product may be from about 100 to about several thousand microns, depending upon intended usages to be made thereof. Although microspheres are herein referred to, it should be understood that the particles may not necessarily be perfectly spherical but may be generally spheroidal, oblate, etc.

The fuel 14 within the metal shell or exterior 12 preferably in the form of a deposit or coating may be of a wall thickness which is any fraction of the sphere radius depending upon the amount of fuel or effects sought from the microsphere. The maximum thickness may be limited by the loading process.

Typical materials which may be used as a fuel are such as deuterium-tritium (DT), deuterium ($D_2$), and tritium ($T_2$). Mixtures of the above may be used in order to achieve or provide desired properties or reactions and the same may not necessarily be entirely condensed as a coating to provide the desired results. The volume 16 within the hollow thermonuclear fuel may be partially evacuated as a result of deposition of the fuel upon the metal shell, i.e., a partial vacuum forms as gas provided within the material or metal shell 12 solidifies due to reduction in temperature. Evacuation of this volume may be also accomplished by the process used in preparing the microspheres or particles. Evacuation may be such as to be considerably less than 1 Torr but in any event should be such that substantially all of the fuel is deposited on the inner wall of the metal shell 12.

The method of making the hereinabove described microspheres, or encapsulated, generally spheroidal, particulate fuels, which is the subject of this invention, may be by such as:

A. grinding and sieving of the selected material to obtain the required uniform size particles, to be preferably from about 75 to about 500 microns, and passing the particles through a plasma or high temperature zone of an induction-coupled plasma torch to form hollow, generally spheroidal fuel shells having diameter sizes ranging from about 100 microns to about several thousand microns and preferably from 100 microns to about 700 microns.

b. physical entrapment or dissolution of a hydrogen isotope or other suitable gas by allowing said gas to diffuse into the material particles.

Another method for producing hollow shells is by pinch welding capillary or the like tubes, composed of one of the hereinabove mentioned materials, at both ends with a small amount of the fuel to be used trapped within the capillary tubes. These particles may be given a roughly spherical shape by heating them in a suitable furnace such as an induction furnace to slightly above the yield temperature of the metal and allowing the gas contained therein to push out the walls of the capillary.

A further method of producing hollow microspheres may be such as to coat glass microballoons. This may be accomplished by depositing nickel from nickel carbonyl or by vapor deposition of metals in a vacuum in accordance with the following equation:

$$Ni(CO_4) \rightarrow Ni + 4CO$$

The preferred method of making the encapsulated fuel particle may begin with the hollow spheres of the material to be used. These hollow spheres or spheroids of suitable size and material as described hereinabove, may be contacted with the gaseous fuel which is to be used, at a temperature of about 370° to about 770° Kelvin and preferably from about 470° to 600° Kelvin for a period of from about 1 to about 48 hours. The length of time in which contact between the gaseous and the solid hollow sphere is maintained will be determined by the extend of diffusion desired into the spheres. It is understood that the usual process control factors which are within the skill of the art would be incorporated into this process. For example, the microspheres would have been cleaned and sieved to appropriate diameters prior to diffusion processes.

In addition to maintaining the contact at a suitable temperature as recited, the gaseous fuels may be at or under a pressure of up to several thousand pounds per square inch (psi) in order to load the desired quantity of fuel into the hollow metal sphere. During the loading process, the pressure differential between the fuel on the outside and within the hollow sphere may be maintained within the range of two psi to several hundred psi, i.e., limited by the ultimate tensile strength of said metal spheroids, in order to cause the fuel to diffuse inward at an acceptable rate. Once the desired quantity of fuel has permeated through the hollow metal shell wall, the pressure and temperature may be reduced by suitable means such as by quenching in a suitable cryogenic fluid such as liquid nitrogen. If desired the gas may be solidfied and deposited on the wall of the metal sphere by further cooling in liquid helium.

In order to store the bulk of the fuel as a solid the temperature to which the material is cooled will be dependent upon the type of gas utilized. For example, if deuterium is used, cooling should be effected to at least less than about 18.7° Kelvin and preferably less than about 18° Kelvin. If deuterium-tritium is used, then cooling should be effected or maintained at least less than about 19.7° Kelvin and preferably less than about 19° Kelvin.

This temperature should be maintained until the fuel is used. Effective storage of the fuel as a dense gas can be accomplished at temperatures from about 77° Kelvin to about 4° Kelvin.

The amount of fuel within a given size sphere may be varied as desired for achieving different energy outputs, but the amount of fuel which may be loaded also depends upon the molar volume (or density) of the fuel in its final form under the specified cryogenic storage conditions prior to use. Typical values for solid hydrogen ($H_2$), deuterium, deuterium-tritide, and tritium are as follows:

TABLE I

|   | Molar Volume ($cm^2$/mole)* | Density ($g/cm^2$)** |
|---|---|---|
| $H_2$ | 22.65 | 0.0888 |
| $D_2$ | 19.65 | 0.204 |
| DT | 18.02 | 0.278 |
| $T_2$ | 16.48 | 0.365 |

*$cm^2$/mole = centimeters squared per mole
**$g/cm^2$ = grams per square centimeter The above values are at a storage condition of about 4.2° Kelvin As an illustration, a 10% to 30% volume packing fraction, may be assumed. The volume packing fraction (expressed as %) is equal to the volume occupied by fuel divided by internal volume of sphere times 100. For example, a hollow sphere of fuel such as D-T whose thickness is approximately about 5% to about 10% of the inner radius of the metal shell may be formed by depositing or freezing out the fuel as a coating, onto the interior of the shell. The energy release per pellet for the (D-T) and (D-D) reactions is shown in FIG. 2 at a reaction efficiency of about 5%. The horizontal cross-hatched region in the figure depicts the yield for a one-megawatt level at a detonation rate of 50 pellets per second. The yield may drop off rapidly for microsphere sizes below approximately 100 microns inner diameter, and a preferred size to produce a useful thermonuclear reaction may be in the range of from about 300 to about 400 microns for the (D-T) reaction and somewhat larger, such as about 500 to about 700 microns, for the (D-D) reaction. Table II illustrates the energy released per microsphere as a function of sphere diameter. From this table, we can conclude that hollow metallic spheres in the size range which can be readily produced can be loaded with sufficient thermonuclear fuel and that when "burned" or ignited to effect a fusion reaction with an efficiency of 5% will produce a significant release of energy. Specifically, hollow spheres approximately 350 microns in diameter containing D-T fuel with a 15% packing fraction when "burned" at a rate of 50 per second will release energy at a gross power level of approximately one megawatt.

TABLE II

| Sphere Inner Diameter (microns) | Volume ($\times 10^{-6} cm^3$) | No. of DT Molecules (15% packing) | No. of $D_2$ Molecules (15% packing) | D-T Energy Released (joules/pellet) (5% efficiency) | D-D Energy Released (joules/pellet) (5% efficiency) |
|---|---|---|---|---|---|
| 100 | 0.524 | $2.63 \times 10^{15}$ | $2.42 \times 10^{15}$ | $3.69 \times 10^2$ | $7.71 \times 10^1$ |
| 200 | 4.19 | $2.11 \times 10^{16}$ | $1.94 \times 10^{16}$ | $2.95 \times 10^3$ | $6.18 \times 10^2$ |
| 300 | 14.1 | $7.08 \times 10^{16}$ | $6.51 \times 10^{16}$ | $9.90 \times 10^3$ | $2.06 \times 10^3$ |

TABLE II-continued

| Sphere Inner Diameter (microns) | Volume ($\times 10^{-6}$ cm$^3$) | No. of DT Molecules (15% packing) | No. of D$_2$ Molecules (15% packing) | D-T Energy Released (joules/pellet) (5% efficiency) | D-D Energy Released (joules/pellet) (5% efficiency) |
|---|---|---|---|---|---|
| 400 | 33.5 | $1.69 \times 10^{17}$ | $1.55 \times 10^{17}$ | $2.36 \times 10^4$ | $4.95 \times 10^3$ |
| 500 | 65.4 | $3.27 \times 10^{17}$ | $3.03 \times 10^{17}$ | $4.59 \times 10^4$ | $9.66 \times 10^3$ |

In diffusing hydrogen, or its isotope, through the material or metal such as nickel, temperatures on the order of a few hundred degrees centigrade may be used. For example, fairly rapid diffusion through thin shells of nickel takes place between 600°–700° Kelvin which is well below temperatures where the yield strength of nickel is significantly affected. In order to load the necessary mass of fuel by diffusion at this temperature, however, the process must be, as stated hereinabove, conducted at elevated pressures. Diffusion or sorption times vary considerably depending upon the conditions of the material; however, typical times are of the order of several hours such as from about 1 to about 48 hours at from about 370° to about 770° Kelvin.

A general idea of the loading pressures to be encountered may be obtained from the principle of corresponding states. The compressibility factor as a function of the reduced temperature and pressure is illustrated graphically in FIG. 3. For example, with a deuterium-tritium fuel for one megawatt of power in accordance with FIG. 2, there may be employed a 400 micron inner diameter microsphere with a packing fraction of approximately 0.15. The critical temperature and pressure of D-T are about 39.4° Kelvin and about 17.5 atmospheres respectively (for D$_2$ the critical constants are about 38.3° Kelvin and about 16.3 atmospheres). A loading temperature of about 600° Kelvin, which should be adequate for reasonably rapid diffusion, yields a reduced temperature ($T_r$) of 15° Kelvin. The principle of corresponding states specifies:

$$P\widetilde{V}/RT = Z(P_r, T_r)$$

where V is the molar volume and $Z(P_r, T_r)$ is a generalized compressibility which is a universal function of reduced pressure, $P_r$, and reduced temperature, $T_r$. Since $V = 18.02$ cm$^3$/mole and the loading temperature, $T_L$, is 600° Kelvin, the loading pressure, $P_L$, must satisfy:

$$P_L = (\text{packing fraction}) \times 2730 \times Z(P_r, T_r).$$

This may be resolved by successive approximations in FIG. 3 to yield a loading pressure of approximately 500 atmospheres (7400 psi), a readily attainable pressure. The use of accurate equations of state for the fuels in the high pressure regions enables the loading of the microspheres with precision and reproducibility. The maximum allowable pressure within a sphere may be estimated by the formula:

$$P_{max} = 2tS(T)/R$$

where $P_{max}$ is the burst pressure, t is the vessel wall thickness, R is the radius of the internal cavity and S(T) is the tensile strength (about $4.6 \times 10^4$ psi at 300° Kelvin for nickel).

An electric charge may also be placed on the particles by electron bombardment, thereby permitting the particles to be accelerated. In this case the versatility of the particles as a fuel is enhanced since they could be handled and injected by means of electric fields.

Another advantage in using the particulate fuel described herein arises because the high atomic number shell acts as a "pusher" or a body of relatively high inertia upon which the fuel material will react as the burst of laser energy is transferred to the sphere. Being a hollow coating on the inside of the protective sphere, the fuel will be accelerated toward the center of the sphere reacting of "pushing" against the outer metal sphere. The increased kinetic energy of the imploding fuel particles with velocities impacted radially inwards increases the temperature and density of the fuel at the center of the sphere resulting in a higher probability of thermonuclear burn over non-imploded, non-pushed fuel forms.

What is claimed is:

1. A method of producing a fuel particle comprising forming hollow spheroids of a material with mass number above 50, thereafter immersing said hollow spheroids in a gaseous atmosphere selected from the group consisting of deuterium, tritium, and mixtures thereof, subsequently heating said spheroids to from about 370° Kelvin to about 770° Kelvin for a period of time of about 1 to 48 hours and at pressures of from about 2 pounds per square inch to about the ultimate tensile strength of said material spheroids, said heating and said pressure effecting diffusion of said gas into said spheroids, and thereafter cooling said hollow spheroids having said gas diffused therein to from about 77° Kelvin to about 4° Kelvin.

2. The method of claim 1 wherein said cooling is to from about 19.7° Kelvin to about 4° Kelvin.

3. The method of claim 1 wherein said heating is to from about 470° Kelvin to about 600° Kelvin.

4. The method of claim 1 wherein said forming comprises grinding said material to from about 75 to about 500 microns diameter, sieving said ground material to separate substantially uniform sized particles, and passing said substantially uniform sized particles through the high temperature zone of an induction coupled plasma torch to form said hollow spheroid microspheres having diameter sizes ranging from about 100 microns to about 700 microns.

* * * * *